United States Patent
Sumimoto et al.

(10) Patent No.: US 7,588,860 B2
(45) Date of Patent: Sep. 15, 2009

(54) LITHIUM PRIMARY BATTERY

(75) Inventors: Daisuke Sumimoto, Neyagawa (JP); Mitsugu Okahisa, Ibaraki (JP); Masahiko Yoshida, Suita (JP); Toshihiko Ikehata, Hirakata (JP)

(73) Assignee: Panasonic Corporation, Osaka (JP)

( * ) Notice: Subject to any disclaimer, the term of this patent is extended or adjusted under 35 U.S.C. 154(b) by 807 days.

(21) Appl. No.: 11/201,434

(22) Filed: Aug. 11, 2005

(65) Prior Publication Data

US 2006/0051672 A1    Mar. 9, 2006

(30) Foreign Application Priority Data

Sep. 3, 2004    (JP) .............. 2004-257292
Apr. 22, 2005    (JP) .............. 2005-125457

(51) Int. Cl.
H01M 4/50    (2006.01)
H01M 4/58    (2006.01)

(52) U.S. Cl. .................. 429/224; 429/231.95

(58) Field of Classification Search ........... None
See application file for complete search history.

(56) References Cited

U.S. PATENT DOCUMENTS

| | | | |
|---|---|---|---|
| 4,312,930 | A | 1/1982 | Hunter |
| 6,759,167 | B2 * | 7/2004 | Bowden et al. ............ 429/224 |
| 2003/0118906 | A1 | 6/2003 | Bowden et al. |
| 2003/0215712 | A1 * | 11/2003 | Feddrix et al. ............ 429/224 |
| 2004/0058242 | A1 | 3/2004 | Christian et al. |
| 2005/0003269 | A1 * | 1/2005 | Nanjundaswamy et al. . 429/220 |

FOREIGN PATENT DOCUMENTS

| | | |
|---|---|---|
| EP | 0 027 076 | 4/1981 |
| JP | 57-4064 A | 1/1982 |
| JP | 59 158073 | 9/1984 |
| JP | 61-218068 A | 9/1986 |
| JP | 10-321227 A | 12/1998 |
| JP | 11-329424 A | 11/1999 |
| JP | 2000-327332 | 11/2000 |
| JP | 2002-117896 A | 4/2002 |
| JP | 2003-346805 A | 12/2003 |

OTHER PUBLICATIONS

Read et al., "Low Temperature Performance of Lambda-$MnO_2$ in Lithium Primary Batteries", *Electrochemical and Solid-State Letters* IEEE Services Cent, Piscataway, NJ, US col. 4, No. 10, Oct. 2001, pp. A162-A165, XP001100985.
Read et al., "Low Temperature Performance of Lambda-$MnO_2$ for Land Warrior Applications", Proceedings of the Power Sources Conference 2002, pp. 108-111, XP008057304.

* cited by examiner

*Primary Examiner*—Dah-Wei D Yuan
*Assistant Examiner*—Maria J Laios
(74) *Attorney, Agent, or Firm*—McDermott Will & Emery LLP

(57) ABSTRACT

A lithium primary battery including: a positive electrode containing a mixed crystalline manganese oxide; a negative electrode containing at least one selected from the group consisting of lithium and a lithium alloy; and a lithium-ion conductive non-aqueous electrolyte. The mixed crystalline manganese oxide contains at least λ-type manganese oxide and β-type manganese oxide, and the β-type manganese oxide has a crystallinity of 300 to 500. The mixed crystalline manganese oxide preferably has a specific surface area of 0.5 to 4 $m^2$/g. The lithium alloy preferably contains at least aluminum in an amount of 0.2 wt % to 15 wt %.

7 Claims, 1 Drawing Sheet

F I G. 1
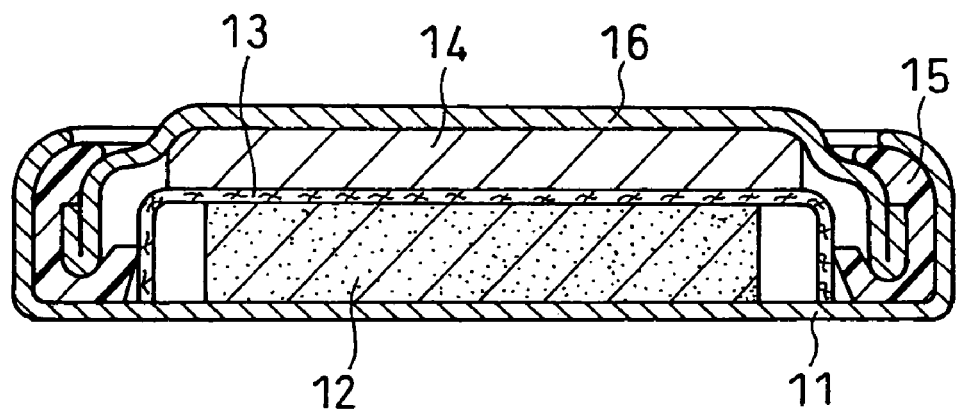

LITHIUM PRIMARY BATTERY

FIELD OF THE INVENTION

The present invention relates to a lithium primary battery using a non-aqueous electrolyte. More specifically, the present invention relates to the optimization of physical properties of manganese oxide, which is used as a positive electrode active material of lithium primary batteries. This optimization allows improvements in storage characteristics particularly at high temperatures, electrical characteristics, reliability, and an improvement in versatility of lithium primary batteries.

BACKGROUND OF THE INVENTION

Conventionally, lithium primary batteries have widely been used for appliances whose ambient temperature is approximately −20° C. to 60° C., which is close to the temperature range of human life. However, the application range of battery-powered appliances has recently been expanding, and the operating temperature range of such appliances also tends to expand commensurately. In in-car appliances, for example, there is an increasing demand for primary batteries that can maintain their functions for a certain period of time in a condition whose maximum ambient temperature can possibly become 125° C. and that are operable even at a low temperature of approximately −40° C.

However, since the positive electrode of a lithium primary battery contains manganese oxide, the catalytic action thereof decomposes a non-aqueous electrolyte in a high temperature range, which may cause an increase in the inner pressure of the battery. If the inner pressure of a coin battery increases, the contact among battery components is impaired, causing an increase in internal resistance. Also, in a cylindrical battery with a current-collecting structure employing leads, a rise in battery inner pressure may cause electrolyte leakage or the like, leading to degradation in battery characteristics. Particularly when a battery is exposed to a temperature environment of 100° C. or higher, the amount of gas evolved in the battery increases, possibly resulting in a large expansion of the battery. Such expansion significantly impairs the contact among battery components, thereby increasing the possibility of a rise in internal resistance, electrolyte leakage, and breakage.

Also, under a high-temperature environment, dissolution of manganese from the positive electrode is promoted, and the dissolved manganese is deposited on the negative electrode to form a high resistance film thereon, which may result in an increase in battery internal resistance. Particularly when a lithium primary battery is used over an extended period of time under a high-temperature environment, the dissolution of manganese from manganese oxide is promoted, so that the high resistance film deposited on the negative electrode surface becomes firm. The high resistance film significantly decreases the electrical characteristics of lithium primary batteries, and particularly decreases the large-current discharge characteristics and pulse discharge characteristics at low temperatures remarkably.

On the other hand, in the field of lithium secondary batteries, there has been a proposal to reduce the specific surface area of a spinel-type lithium manganese oxide used as a positive electrode active material, in order to limit the reaction site of the lithium manganese oxide and an electrolyte and therefore to suppress electrolyte decomposition and manganese dissolution (Japanese Laid-Open Patent Publication No. Hei 10-321227, Japanese Laid-Open Patent Publication No. 2002-117896, and Japanese Laid-Open Patent Publication No. 2003-346805). Likewise, in the field of primary batteries, it is considered that reducing the specific surface area of manganese dioxide also enables electrolyte decomposition and manganese dissolution to be suppressed to a certain degree.

However, manganese oxide used in a conventional primary battery is made of γ-type manganese oxide obtained by heat-treating β-type electrolytic manganese dioxide or the like at 350° C. to 430° C., or a mixed crystal of γ-type manganese oxide and β-type manganese oxide (hereinafter referred to as γ-β-type manganese oxide) (Japanese Laid-Open Patent Publication No. Sho 57-4064). With respect to the γ-β-type manganese oxide, its specific surface area can be reduced only to approximately 5 m²/g even if electrolytic conditions and baking conditions are changed. Therefore, there is a limit to suppressing electrolyte decomposition and manganese dissolution by reducing the specific surface area. Also, when the specific surface area of manganese oxide is reduced, the reaction site is limited, so there is a disadvantage that the low temperature characteristics (particularly low temperature discharge characteristics) are degraded. There is a trade-off between this disadvantage and the suppression of gas evolution and the like.

In the field of lithium secondary batteries, there has been a proposal to replace part of the manganese element of a spinel-type lithium manganese oxide with another element, such as magnesium, aluminum, iron, calcium, or chromium, in order to strengthen the structure of the lithium manganese oxide and therefore to suppress the dissolution of manganese into an electrolyte (Japanese Laid-Open Patent Publication No. 2000-327332).

In the field of lithium secondary batteries, there has been another proposal to use as a positive electrode active material a manganese oxide whose crystal structure is intermediate between the spinel-type lithium manganese oxide and the λ-type manganese oxide, in order to suppress the destruction of the crystal structure of the positive electrode active material. Such manganese oxide is prepared by removing part of lithium included in the spinel-type lithium manganese oxide by means of acid treatment (Japanese Laid-Open Patent Publication No. Hei 11-329424 and U.S. Pat. No. 4,312,930).

Further, regarding the conventional temperature range, not the high temperature range of 100° C. or more, there has been a proposal to use a lithium alloy in the negative electrode, in order to suppress the formation of a film that serves as a resistance component on the negative electrode surface, reduce the internal resistance of a primary battery, and improve its reliability (Japanese Examined Patent Publication Hei 7-63016).

As described above, in primary batteries, despite the attempts to reduce the specific surface area of manganese oxide for suppressing electrolyte decomposition and manganese dissolution in the positive electrode, the specific surface area can be reduced only to approximately 5 m²/g, and hence, its effects are limited. Also, when the specific surface area of manganese oxide is reduced, the reaction site is limited, so there is a disadvantage that low temperature characteristics are lowered. Also, when a lithium alloy is used in the negative electrode to reduce internal resistance, the film formation on the negative electrode surface can be suppressed, but it is not possible to suppress the emission of gas due to electrolyte decomposition and the dissolution of manganese element and the like from the positive electrode active material, which are causes of the film formation.

BRIEF SUMMARY OF THE INVENTION

Under such circumstances, the present invention optimizes the physical properties of manganese oxide used as a positive electrode active material, whereby gas evolution and manganese dissolution are suppressed in lithium primary batteries without impairing the low temperature characteristics thereof. By this, the present invention intends to improve the storage characteristics particularly at high temperatures and electrical characteristics of lithium primary batteries. The present invention also optimizes the negative electrode active material and thereby intends to further improve the reliability of lithium primary batteries.

The present invention relates to a lithium primary battery including: a positive electrode containing a mixed crystalline manganese oxide (manganese oxide in a mixed crystal state); a negative electrode containing at least one selected from the group consisting of lithium and a lithium alloy; and a lithium-ion conductive non-aqueous electrolyte. The mixed crystalline manganese oxide contains at least λ-type manganese oxide (manganese oxide with a λ-type crystal structure) and β-type manganese oxide (manganese oxide with a β-type crystal structure), and the β-type manganese oxide has a crystallinity of 300 to 500, and preferably 350 to 450.

The mixed crystalline manganese oxide preferably has a specific surface area of 0.5 to 4 $m^2/g$, and more preferably 1.5 to 3.5 $m^2/g$.

The mixed crystalline manganese oxide in an initial state may contain lithium, but the lithium content in the manganese oxide is preferably 1.5 wt % or less, and more preferably 1.0 wt % or less. The manganese oxide in an initial state as used herein refers to: a mixed crystalline manganese oxide that has been just produced as an active material; a manganese oxide contained in a battery that has been just produced and has not been discharged; or a manganese oxide that is contained in a battery after its production and has been a little discharged to a characteristic stable region.

It is preferred that the manganese element contained in the mixed crystalline manganese oxide be partially replaced with another element. It is particularly preferred to use magnesium as another element. In order to secure discharge capacity as a primary battery, and to improve long-term reliability by suppressing the dissolution of manganese into the electrolyte, it is desirable that the content of another element in the mixed crystalline manganese oxide be 1 wt % or less.

The mixed crystalline manganese oxide in accordance with the present invention is obtained by baking λ-type manganese oxide, for example, at 100° C. to 300° C. for 1 to 6 hours.

The λ-type manganese oxide can be obtained, for example, by bringing a spinel-type lithium manganese oxide (lithium manganate) into contact with a sulfuric acid solution to remove lithium, and washing and drying it. It is desirable that the manganese element of the spinel-type lithium manganese oxide be partially replaced with another element such as Mg. Thereafter, by baking the dried λ-type manganese oxide, for example, at 100° C. to 300° C., part of the λ-type manganese oxide is converted to β-type manganese oxide, whereby a mixed crystalline manganese oxide is obtained. It is noted that λ-type manganese oxide is also called spinel-type manganese oxide.

The lithium alloy contained in the negative electrode as an active material preferably contains at least aluminum. Also, the content of aluminum in the lithium alloy is preferably 0.2 wt % to 15 wt %.

The lithium alloy may be synthesized either inside or outside the battery. In the case of synthesizing an alloy outside the battery, lithium and an element other than lithium are alloyed beforehand, and the resultant alloy is then caused to be included in the negative electrode, to produce the battery. In the case of synthesizing an alloy inside the battery, for example, lithium (or metal other than lithium) is caused to be included in the negative electrode, while metal foil made of an element other than lithium (or lithium foil) is pressed to the surface of the negative electrode facing the positive electrode, to produce the battery. Then, during or after the fabrication of the battery, these elements are alloyed inside the battery.

The lithium primary battery of the present invention is produced, using the above-mentioned mixed crystalline manganese oxide, the negative electrode including lithium and/or a lithium alloy and a lithium-ion conductive non-aqueous electrolyte.

The present invention can suppress gas evolution and manganese dissolution from the positive electrode of a lithium primary battery without impairing low temperature characteristics thereof, and it can further suppress an increase in resistance on the negative electrode surface. Accordingly, it is possible to remarkably improve storage characteristics at high temperatures and reliability.

Also, since the present invention reduces gas evolution and manganese dissolution from the positive electrode, the battery reliability is improved not only at high temperatures but also in the ordinary temperature range. As a result, it is possible to obtain a lithium primary battery preferable for appliances requiring long-term reliability.

That is, conventional lithium primary batteries have usually been used where the upper limit of the ambient temperature is approximately 60° C., being suited for applications of relatively short-time use. However, the lithium primary battery of the present invention has a high versatility and is suited for applications in which appliances are used at −40° C. to 125° C. or operated for longer periods of time than conventional periods.

Further, the present invention can suppress deposition of a high resistance film on the negative electrode surface, and in addition, can control the crystallinity of β-type manganese oxide at 300 to 500. Accordingly, it is possible to remarkably improve the electrical characteristics of lithium primary batteries, particularly large-current discharge characteristics and pulse discharge characteristics.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE SEVERAL VIEWS OF THE DRAWING

FIG. 1 is a longitudinal sectional view of a coin-type lithium primary battery.

DETAILED DESCRIPTION OF THE INVENTION

A lithium primary battery in accordance with the present invention includes a positive electrode containing a mixed crystalline manganese oxide, a negative electrode containing at least one selected from the group consisting of lithium and a lithium alloy, and a lithium-ion conductive non-aqueous electrolyte. A preferable mixed crystalline manganese oxide is composed mainly of λ-type manganese oxide and contains a small amount of β-type manganese oxide.

From the viewpoint of maintaining large-current discharge characteristics and pulse discharge characteristics, the crystallinity of the β-type manganese oxide is required to be 300 to 500, and preferably 350 to 450. From the viewpoint of improving storage characteristics and suppressing manganese dissolution, it is also possible to use λ-type manganese oxide that is almost free from β-type crystal. However, it is thought that the use of a mixed crystal including λ-type manganese oxide and a suitable amount of β-type manganese oxide improves the reactivity, because the interface (grain boundary) between the λ-type crystal and the β-type crystal functions as a new lithium movement path. For example, by subjecting λ-type manganese oxide to a heat-treatment, part of the λ-type manganese oxide is converted to β-type manganese oxide, and at the same time, the crystallinity of the 1-type manganese oxide can be controlled at 300 to 500.

The crystallinity serves as a measure in evaluating crystal state. The crystal state of the β-type manganese oxide produced partially in the λ-type manganese oxide by the heat-treatment can be found from its crystallinity. If the crystallinity of the β-type manganese oxide exceeds 500, lithium cannot easily enter the lattice of the manganese oxide, or the amount of the manganese oxide that can be used for discharging becomes less, thus leading to degradation in discharge characteristics. Also, if the crystallinity of the β-type manganese oxide is less than 300, the size and state of such crystal lattice are uneven. Hence, there coexist a region where lithium ions can move easily and a region where they cannot on the surface of or inside the manganese oxide, thereby resulting in degradation in discharge characteristics in the whole region.

If the crystallinity of the β-type manganese oxide is 300 to 500, an optimum balance is achieved between the readiness of lithium ions to enter the lattice of the manganese oxide (surface reactivity), the diffusibility of lithium ions inside the manganese oxide, the stability of lithium ions inside the lattice of the manganese oxide, etc. Thus, better electrical characteristics than conventional ones, particularly good large-current discharge characteristics and pulse discharge characteristics are achieved.

In the present invention, the crystallinity is determined from the peak attributed to the (110) face of β-type manganese oxide included in an X-ray diffraction image of a mixed crystalline manganese oxide. The crystallinity is defined as the value obtained by dividing the height (intensity) of the peak by the half width thereof.

In conventional electrolytic manganese dioxide, its specific surface area can be reduced only to approximately 5 $m^2/g$; however, in the mixed crystalline manganese oxide according to the present invention, its specific surface area can be reduced to 4 $m^2/g$ or less. When the specific surface area is reduced, the reaction site between the manganese oxide and an electrolyte is limited, so that electrolyte decomposition and manganese dissolution are suppressed.

Also, such reduction of specific surface area involves a change in the crystal structure of the manganese oxide. Thus, unlike the case of reducing the specific surface area while maintaining the structure, the disadvantage of limited reaction site is small. This is because a mixed crystalline manganese oxide including a suitable amount of λ-type crystal and β-type crystal has a new lithium-ion movement path comprising the interface between the λ-type crystal and the β-type crystal.

The specific surface area of the mixed crystalline manganese oxide is preferably 0.5 to 4 $m^2/g$, and more preferably 1.5 to 3.5 $m^2/g$. If the specific surface area is less than 0.5 $m^2/g$, the discharge reaction site where the manganese oxide comes into contact with the electrolyte becomes insufficient, which may result in degradation in characteristics of continuous discharge at a large current and pulse discharge at low temperatures. On the other hand, if the specific surface area exceeds 4 $m^2/g$, the decomposition reaction of the electrolyte by the manganese oxide is suppressed less effectively, so that the gas evolution may not be suppressed sufficiently. The degradation of characteristics tends to increase particularly in a high-temperature environment.

Further, when compared with γ-β-type manganese oxide or γ-type manganese oxide, λ-type-crystal based manganese oxide has a relatively stable structure, and such stabilization of structure also contributes to reducing the amount of manganese dissolved into the electrolyte. This reduces the possibility that the manganese dissolved in the electrolyte is deposited on the negative electrode to form a high resistance film thereon, thus leading to an improvement in the reliability of primary batteries.

The mixed crystalline manganese oxide may contain lithium in an initial state, but the lithium content is preferably 1.5 wt % or less, and more preferably 1 wt % or less. If the lithium content in an initial state exceeds 1.5 wt %, the battery voltage during discharging (hereinafter referred to as discharge-maintaining voltage) does not exert a normal stable discharge curve, but exerts a two-stage curve. As a result, the discharge capacity of a battery with a voltage of 3 V class is greatly impaired if the end of discharge voltage is set at about 2 V.

When the manganese oxide stably contains a certain amount of lithium in its lattice beforehand, the lithium contained therein affects the reaction site of lithium that will enter the lattice upon discharge. This is probably the reason why a normal stable discharge curve is not described. Also, if lithium is electrochemically caused to be contained in an amount greater than 1.5 wt % by a discharge treatment called preliminary discharge, the discharge capacity is decreased in a corresponding amount. Thus, a spinel-type lithium manganese oxide used as an active material of secondary batteries is greatly insufficient in capacity and useless as an active material of primary batteries, although it has almost the same structure as that of λ-type manganese oxide.

It is preferred that the manganese element of the mixed crystalline manganese oxide be partially replaced with another element. Examples of another element include Mg, Al, Fe, Ca, Cr, Ti, V, Co, Ni, Cu, and Zn. Although the reason is not clear, the use of magnesium is most effective in suppressing manganese dissolution and improving discharge characteristics. It should be noted, however, that primary batteries that are discharged only once are different in factors to be considered from secondary batteries that are designed to be charged and discharged repeatedly. Therefore, one cannot think that the optimum amount of another element used in the lithium primary battery of the present invention is the same as the amount of manganese element replaced in a lithium manganese oxide in the field of lithium secondary batteries.

In the positive electrode active material of the primary battery which only receives lithium upon discharge, it is desirable that the content of another element be 1 wt % or less. If the content of another element exceeds 1 wt %, stable discharge reaction due to entrance of lithium into manganese oxide is inhibited for the same reason as that in the case of the manganese oxide containing lithium beforehand, so that the battery capacity is significantly impaired. Thus, in order to secure discharge capacity as a primary battery, and to improve long-term reliability by suppressing the dissolution of manganese into the electrolyte, it is desirable that the content of another element be 1 wt % or less.

The mixed crystalline manganese oxide of the present invention containing λ-type manganese oxide and β-type manganese oxide can be produced, for example, by baking λ-type manganese oxide at 100° C. to 300° C. It is desirable to bake, for example, for about 1 to 6 hours (preferably, about 2 to 4 hours), while supplying air so as not to cause a shortage of oxygen.

λ-type manganese oxide may be obtained by any method. For example, λ-type manganese oxide can be obtained by bringing a spinel-type lithium manganese oxide into contact with a sulfuric acid solution to remove lithium from the spinel-type lithium manganese oxide. The λ-type manganese oxide thus obtained is washed to remove sulfuric acid therefrom, dried, and baked at 100° C. to 300° C., whereby part of the λ-type manganese oxide can be converted to β-type manganese oxide. The lithium content in the manganese oxide can be controlled freely by adjusting the time for which the spinel-type lithium manganese oxide was kept into contact with the sulfuric acid solution.

Also, λ-type manganese oxide in which the manganese element is partially replaced with another element can be obtained by bringing a spinel-type lithium manganese oxide in which the manganese element is partially replaced with another element into contact with a sulfuric acid solution to remove lithium therefrom.

The spinel-type lithium manganese oxide in which the manganese element is partially replaced with another element can be obtained by mixing manganese dioxide, a hydroxide of another element such as Mg or Al, and lithium carbonate and baking the mixture at 700 to 900° C. (Japanese Laid-Open Patent Publication No. 2000-327332).

The negative electrode for the lithium primary battery contains at least one selected from the group consisting of lithium and a lithium alloy. Lithium and a lithium alloy may be used singly or in combination. Preferable lithium alloys include lithium-aluminum alloys (Li—Al alloys). A lithium alloy may be prepared by any method. From the viewpoint of securing discharge capacity and stabilizing internal resistance, it is desirable that the content of a metal element other than lithium be 0.2 wt % to 15 wt %.

The lithium-ion conductive non-aqueous electrolyte which can be used herein comprises a non-aqueous solvent and a lithium salt dissolved therein. Exemplary non-aqueous solvents include a cyclic carbonic acid ester, a chain carbonic acid ester, a cyclic ether, a chain ether, and lactones, and they may be used singly or in combination with two or more of them. Also, exemplary lithium salts include $LiClO_4$, $LiNCF_3SO_3$, $LiN(CF_3SO_2)_2$, $LiBF_4$, and $LiPF_6$, and they may be used singly or in combination with two or more of them.

EXAMPLE 1

(i) Preparation of Mixed Crystalline Manganese Oxide Comprising λ-Type Manganese Oxide and β-Type Manganese Oxide First, a spinel-type lithium manganese oxide was prepared by mixing manganese dioxide, lithium hydroxide, and lithium carbonate in a predetermined ratio and baking the mixture at 800° C.

The resultant spinel-type lithium manganese oxide was immersed in a sulfuric acid solution, to remove lithium from the lithium manganese oxide. This manganese oxide was then subjected to treatments of washing and drying, to produce λ-type manganese oxide with a lithium content of 1.5 wt %.

The resultant λ-type manganese oxide was heat-treated in air at 200° C. for 2 hours, to obtain a mixed crystalline manganese oxide with a mean particle size of 15 μm, a specific surface area of 2.0 $m^2/g$, and a crystallinity of β-type manganese oxide of 400. There was no change in the lithium content and the manganese content before and after the heat-treatment.

The crystallinity, lithium content, mean particle size and specific surface area of the manganese oxide were measured or determined in the following manners.

[Crystallinity]

Using an X-ray diffraction (XRD) analyzer (X'Pert available from Philips), the diffraction image of a mixed crystalline manganese oxide was measured. The height (intensity) of the peak attributed to the (110) face of β-type manganese oxide was divided by the half width thereof. This value was used as crystallinity.

[Lithium Content]

Lithium content was determined by dissolving a sample in hydrochloric acid and subjecting the resultant solution to a high-frequency inductively coupled plasma spectrometry (ICP). The analyzer used was ICPS-1000III manufactured by Shimadzu Corporation.

[Mean Particle Size]

Using a laser scattering particle size distribution analyzer LA-910 of Horiba, Ltd., the median diameter ($D_{50}$) of particles was measured.

[Specific Surface Area]

Using ASAP 2010 of Shimadzu Corporation (manufactured by Micromeritics), and using nitrogen as the adsorption gas, specific surface area was measured by BET specific surface area analysis (multi-point analysis).

(ii) Production of Positive Electrode

A positive electrode material mixture was prepared by adding 5 parts by weight of ketjen black serving as a conductive agent and 5 parts by weight of polytetrafluoroethylene (PTFE) serving as a binder to 100 parts by weight of the mixed crystalline manganese oxide thus obtained and mixing them sufficiently. This positive electrode material mixture was molded into a disc having a diameter of 20 mm and a thickness of 3.0 mm and then dried at 200° C., to obtain a positive electrode.

(iii) Production of Negative Electrode

A 1.0 mm-thick hoop made of lithium metal was punched out into a disc of 20 mm in diameter, and the disc was used as a negative electrode.

(iv) Production of Lithium Primary Battery

A coin-type lithium primary battery (CR2450) with a diameter of 24.5 mm and a thickness of 5.0 mm, as illustrated in FIG. 1, was produced, and this was named battery A1. The battery A1 was fabricated in the following manner. First, a positive electrode 12 was mounted in the center of a battery case 11, and a separator 13 made of polypropylene non-woven fabric was fitted thereon. Next, a non-aqueous electrolyte (not shown) was injected into the battery case 11. The non-aqueous electrolyte used was prepared by dissolving lithium perchlorate at a concentration of 1 mol/L in a solvent mixture of propylene carbonate and 1,2-dimethoxyethane in a volume ratio of 1:1. A negative electrode 14 was affixed under pressure to the inner face of a sealing plate 16 whose circumference was fitted with a gasket 15. Thereafter, the opening of the battery case 11 was closed with the sealing plate 16.

Also, as a comparative example, a battery A2 was produced in the same manner as the battery A1, except for the use of a manganese oxide (β-type manganese oxide) having a β-type crystal structure which is used in the currently available lithium primary batteries. This β-type manganese oxide had a lithium content of 0 wt %, a magnesium content of 0%, a mean particle size of 15 μm, and a specific surface area of 6.1 m$^2$/g.

The above-mentioned β-type manganese oxide was heat-treated at 320° C., to obtain a manganese oxide with a γ-β-type crystal structure (γ-β-type manganese oxide)(mean particle size 15 μm, specific surface area 6.0 m$^2$/g). Except for the use of this oxide, a battery A3 was produced in the same manner as the battery A1.

The above-mentioned β-type manganese oxide was heat-treated at 420° C., to obtain a manganese oxide with a γ-type crystal structure (γ-type manganese oxide) (mean particle size 15 μm, specific surface area 5.8 m$^2$/g). Except for the use of this oxide, a battery A4 was produced in the same manner as the battery A1.

A battery A5 was produced in the same manner as the battery A1, except for the use of a spinel-type lithium manganese oxide (lithium content 4 wt %, mean particle size 15 μm, specific surface area 2.1 m$^2$/g).

(Evaluation)

In order to verify the effects of the invention, the following evaluations were made. Table 1 shows the results.

[Capacity Check Test]

Each battery was discharged at a fixed resistance of 1 kΩ until the battery voltage reached 2.5 V, to check the discharge capacity.

[High Temperature Storage Test]

Each battery was stored in an environment of 125° C. for 100 hours. As a measure of the amount of gas generated in the battery, the battery thickness was measured before and after the storage, and the difference was calculated as "the amount of post-storage expansion".

Also, the internal resistance (IR) of each battery was measured before and after the storage by an alternating current process at 1 kHz, and the difference was calculated as "the amount of IR change".

[Manganese Dissolution Check Test]

A predetermined manganese oxide or lithium manganese oxide of 2 g was immersed in the above-mentioned non-aqueous electrolyte of 5 cm$^3$ and stored in an environment of 85° C. for 10 days. The amount of manganese dissolved in the electrolyte was measured.

[Pulse Discharge Test]

Each battery was left in an environment of −40° C. for 3 hours or more. After the battery temperature dropped to −40° C., the battery was intermittently discharged for 50 hours by repeating the following pattern: the battery was discharged at 8 mA for 0.5 second and the discharge was stopped for 2 minutes. The lowest battery voltage (pulse voltage) during this intermittent discharge was measured.

TABLE 1

| | Crystal structure | Discharge capacity [mAh] | Amount of post-storage expansion [mm] | Amount of IR change [Ω] | Amount of manganese dissolution [mg/l] | Pulse voltage [V] |
|---|---|---|---|---|---|---|
| A1 | λ-β type | 222 | 0.14 | 21 | 5 | 2.35 |
| A2 | β-type | 208 | 0.61 | 91 | 46 | 2.09 |
| A3 | γ-β-type | 201 | 0.76 | 97 | 44 | 2.23 |
| A4 | γ-type | 214 | 0.98 | 105 | 46 | 2.12 |
| A5 | spinel-type | 119 | 0.16 | 22 | 9 | 2.03 |

As shown in Table 1, the battery A1 of the Example of the present invention has the largest discharge capacity, the smallest post-storage expansion, the smallest IR change, the least manganese dissolution, and the highest lowest-pulse-voltage. That is, the relation of trade-off among these characteristics was not found, and the optimum value was obtained in all the characteristics.

In contrast, the batteries A2 to A4 of Comparative Example had small discharge capacities. Further, these batteries exhibited large post-storage expansions and large IR changes, i.e., large degrees of deterioration due to high temperature storage. In addition, since the batteries A2 to A4 exhibited large manganese dissolutions, there is a high possibility that the dissolved manganese may be deposited on the negative electrode to form a high resistance film thereon in cases of a long-term use. Such results are related to the fact that while the manganese oxide of the battery A1 of the Example of the present invention has an extremely small specific surface area of 2.0 m$^2$/g, the specific surface area of the manganese oxides of the batteries A2 to A4 of Comparative Example can be reduced only to 5 m$^2$/g.

The battery A5 of Comparative Example exhibited a small degree of deterioration due to high temperature storage and a small manganese dissolution, but its discharge capacity was only about half that of other batteries. Also, the pulse voltage of the battery A5 was the lowest of the five kinds of batteries. This is related to the fact that the spinel-type lithium manganese oxide has a small theoretical capacity, because it contains a considerable number of lithium atoms in the crystal lattice beforehand and the number of lithium atoms that can enter the lattice in a discharge reaction is therefore limited.

EXAMPLE 2

A mixed crystalline manganese oxide having a mean particle size of 15 μm, a specific surface area of 2.0 m$^2$/g, and a crystallinity of β-type manganese oxide of 100 was prepared in the same manner as the manganese oxide used in the battery A1, except that the heat-treatment of λ-type manganese oxide was performed at 50° C. for 2 hours. Except for the use of this manganese oxide, a battery B1 was produced in the same manner as the battery A1.

A mixed crystalline manganese oxide having a mean particle size of 15 μm, a specific surface area of 2.0 m$^2$/g, and a crystallinity of β-type manganese oxide of 200 was prepared in the same manner as the manganese oxide used in the battery A1, except that the heat-treatment of λ-type manganese oxide was performed at 75° C. for 2 hours. Except for the use of this manganese oxide, a battery B2 was produced in the same manner as the battery A1.

A mixed crystalline manganese oxide having a mean particle size of 15 μm, a specific surface area of 2.0 m$^2$/g, and a crystallinity of β-type manganese oxide of 300 was prepared in the same manner as the manganese oxide used in the battery A1, except that the heat-treatment of λ-type manganese oxide was performed at 100° C. for 2 hours. Except for the use of this manganese oxide, a battery B3 was produced in the same manner as the battery A1.

A battery B4 was produced in the same manner as the battery A1, using a mixed crystalline manganese oxide having a mean particle size of 15 μm, a specific surface area of 2.0 m²/g, and a crystallinity of β-type manganese oxide of 400, which was the same manganese oxide as that used in the battery A1.

A mixed crystalline manganese oxide having a mean particle size of 15 μm, a specific surface area of 2.0 m²/g, and a crystallinity of β-type manganese oxide of 500 was prepared in the same manner as the manganese oxide used in the battery A1, except that the heat-treatment of λ-type manganese oxide was performed at 300° C. for 2 hours. Except for the use of this manganese oxide, a battery B5 was produced in the same manner as the battery A1.

A mixed crystalline manganese oxide having a mean particle size of 15 μm, a specific surface area of 2.0 m²/g, and a crystallinity of β-type manganese oxide of 600 was prepared in the same manner as the manganese oxide used in the battery A1, except that the heat-treatment of λ-type manganese oxide was performed at 400° C. for 2 hours. Except for the use of this manganese oxide, a battery B6 was produced in the same manner as the battery A1.

A mixed crystalline manganese oxide having a mean particle size of 15 μm, a specific surface area of 2.0 m2/g, and a crystallinity of β-type manganese oxide of 700 was prepared in the same manner as the manganese oxide used in the battery A1, except that the heat-treatment of λ-type manganese oxide was performed at 500° C. for 2 hours. Except for the use of this manganese oxide, a battery B7 was produced in the same manner as the battery A1.

(Evaluation)

In order to verify the effects of the invention, tests were conducted in the same manner as the pulse discharge tests of Example 1, and the lowest battery voltage (pulse voltage) was measured. Table 2 shows the results.

TABLE 2

|    | Crystallinity | Pulse voltage [V] |
|----|---------------|-------------------|
| B1 | 100           | 2.20              |
| B2 | 200           | 2.26              |
| B3 | 300           | 2.34              |
| B4 | 400           | 2.35              |
| B5 | 500           | 2.34              |
| B6 | 600           | 2.27              |
| B7 | 700           | 2.22              |

As shown in Table 2, the batteries B3 to B5 of the Example of the present invention exhibited higher pulse voltages than other batteries. This is probably due to the optimization of balance between the readiness of lithium ions to enter the lattice of the manganese oxide (surface reactivity), the diffusibility of lithium ions inside the manganese oxide, and the stability of lithium ions in the lattice of the manganese oxide.

EXAMPLE 3

A mixed crystalline manganese oxide having a mean particle size of 15 μm, a specific surface area of 0.2 m²/g, and a crystallinity of β-type manganese oxide of 400 was prepared in the same manner as in the preparation of the manganese oxide used in the battery A1, except that the baking temperature of the mixture of raw materials of the spinel-type lithium manganese oxide was made 950° C. Except for the use of this manganese oxide, a battery C1 was produced in the same manner as the battery A1.

A mixed crystalline manganese oxide having a mean particle size of 15 μm, a specific surface area of 0.5 m²/g, and a crystallinity of β-type manganese oxide of 400 was prepared in the same manner as in the preparation of the manganese oxide used in the battery A1, except that the baking temperature of the mixture of raw materials of the spinel-type lithium manganese oxide was made 900° C. Except for the use of this manganese oxide, a battery C2 was produced in the same manner as the battery A1.

A battery C3 was produced in the same manner as the battery A1, using a mixed crystalline manganese oxide having a mean particle size of 15 μm, a specific surface area of 2.0 m²/g, and a crystallinity of β-type manganese oxide of 400, which was the same as the manganese oxide used in the battery A1.

A mixed crystalline manganese oxide having a mean particle size of 15 μm, a specific surface area of 4.0 m²/g, and a crystallinity of β-type manganese oxide of 400 was prepared in the same manner as in the preparation of the manganese oxide used in the battery A1, except that the baking temperature of the mixture of raw materials of the spinel-type lithium manganese oxide was made 700° C. Except for the use of this manganese oxide, a battery C4 was produced in the same manner as the battery A1.

A mixed crystalline manganese oxide having a mean particle size of 15 μm, a specific surface area of 7.0 m²/g, and a crystallinity of β-type manganese oxide of 400 was prepared in the same manner as in the preparation of the manganese oxide used in the battery A1, except that the baking temperature of the mixture of raw materials of the spinel-type lithium manganese oxide was made 550° C. Except for the use of this manganese oxide, a battery C5 was produced in the same manner as the battery A1.

(Evaluation)

In order to verify the effects of the invention, tests were conducted in the same manner as the high temperature storage tests of Example 1, and "the amount of post-storage expansion" and "the amount of IR change" of the batteries were measured. Also, tests were conducted in the same manner as the pulse discharge tests of Example 1, and the lowest voltage (pulse voltage) of the batteries were measured. Table 3 shows the results.

TABLE 3

|    | Specific surface area [m²/g] | Discharge capacity [mAh] | Amount of post-storage expansion [mm] | Amount of IR change [Ω] | Pulse voltage [V] |
|----|------------------------------|--------------------------|---------------------------------------|-------------------------|-------------------|
| C1 | 0.2 | 219 | 0.09 | 16 | 2.19 |
| C2 | 0.5 | 220 | 0.11 | 17 | 2.31 |
| C3 | 2.0 | 222 | 0.14 | 21 | 2.35 |
| C4 | 4.0 | 223 | 0.21 | 27 | 2.37 |
| C5 | 7.0 | 224 | 0.47 | 56 | 2.39 |

As shown in Table 3, in the batteries C2 to C4 of the Example of the present invention, both the post-storage expansion and the IR change were small, and the pulse voltage was higher than that of other batteries. In contrast, in the case of the battery C1, the post-storage expansion and the IR change were favorable, but the pulse voltage was relatively low. This is probably because the small specific surface area of the manganese oxide decreased the discharge reaction site. Also, in the battery C5, the pulse voltage was favorable, but the post-storage expansion and the IR change were relatively large. This is probably because the large specific surface area of the manganese oxide increased the contact area with the electrolyte.

EXAMPLE 4

A mixed crystalline manganese oxide having a lithium content of 0.5 wt %, a mean particle size of 15 μm, a specific surface area of 2.0 m$^2$/g, and a crystallinity of β-type manganese oxide of 400 was prepared in the same manner as the preparation of the manganese oxide used in the battery A1, except that the time for which the spinel-type lithium manganese oxide was immersed in the sulfuric acid solution was changed. Except for the use of this manganese oxide, a battery D1 was produced in the same manner as the battery A1.

A mixed crystalline manganese oxide having a lithium content of 1.0 wt %, a mean particle size of 15 μm, a specific surface area of 2.0 m$^2$/g, and a crystallinity of β-type manganese oxide of 400 was prepared in the same manner as the preparation of the manganese oxide used in the battery A1, except that the time for which the spinel-type lithium manganese oxide was immersed in the sulfuric acid solution was changed. Except for the use of this manganese oxide, a battery D2 was produced in the same manner as the battery A1.

A battery D3 was produced in the same manner as the battery A1, using a mixed crystalline manganese oxide having a lithium content of 1.5 wt %, a mean particle size of 15 μm, a specific surface area of 2.0 m$^2$/g, and a crystallinity of β-type manganese oxide of 400, which was the same as the manganese oxide used in the battery A1.

A mixed crystalline manganese oxide having a lithium content of 2.0 wt %, a mean particle size of 15 μm, a specific surface area of 2.0 m$^2$/g, and a crystallinity of β-type manganese oxide of 400 was prepared in the same manner as the preparation of the manganese oxide used in the battery A1, except that the time for which the spinel-type lithium manganese oxide was immersed in the sulfuric acid solution was changed. Except for the use of this manganese oxide, a battery D4 was produced in the same manner as the battery A1.

A mixed crystalline manganese oxide having a lithium content of 4.0 wt %, a mean particle size of 15 μm, a specific surface area of 2.0 m$^2$/g, and a crystallinity of β-type manganese oxide of 400 was prepared in the same manner as the preparation of the manganese oxide used in the battery A1, except that the time for which the spinel-type lithium manganese oxide was immersed in the sulfuric acid solution was changed. Except for the use of this manganese oxide, a battery D5 was produced in the same manner as the battery A1.

(Evaluation)

In order to verify the effects of the invention, tests were conducted in the same manner as the capacity check tests of Example 1, and the discharge capacity obtained until the battery voltage reached 2.5 V was checked. Table 4 shows the results.

TABLE 4

|  | Lithium content [wt %] | Discharge capacity [mAh] |
|---|---|---|
| D1 | 0.5 | 226 |
| D2 | 1.0 | 224 |
| D3 | 1.5 | 222 |
| D4 | 2.0 | 197 |
| D5 | 4.0 | 119 |

As shown in Table 4, the batteries D1 to D3 of Example of the present invention had sufficient capacities, but the batteries D4 to D5 had smaller discharge capacities. The reason is that, as the lithium content became larger, the discharge-maintaining voltage exerted a two-stage curve more clearly, thereby resulting in a reduction in the discharge time until the battery voltage reached the end of discharge voltage of 2.5 V. When a large amount of lithium is present in the crystal lattice of the manganese oxide before discharge, there is a change in the entering path of lithium that will enter the lattice upon discharge and the site where lithium is stabilized. For this reason, it is thought that such capacity decrease occurs.

EXAMPLE 5

Mixed crystalline manganese oxides having lithium contents of 0 to 1.0 wt %, mean particle sizes of 10 to 20 μm, specific surface areas of 1.0 to 3.0 m$^2$/g, and crystallinities of β-type manganese oxide of 300 to 500 were prepared in the same manner as in the preparation of the manganese oxide used in the battery A1, except that the manganese element in the mixed crystalline manganese oxides was partially replaced with another element such that the contents of another element were as shown in Table 5. Except for the use of these manganese oxides, the batteries E1 to E19 were produced in the same manner as the battery A1.

(Evaluation)

In order to verify the effects of the invention, tests were conducted in the same manner as the capacity check tests of Example 1, and the discharge capacity obtained until the battery voltage reached 2.5 V was checked. Also, tests were conducted in the same manner as the manganese dissolution check tests of Example 1, and the amount of manganese dissolved in the electrolyte was measured. Table 5 shows the results.

TABLE 5

|  | Another element | Content of another element [wt %] | Discharge capacity [mAh] | Amount of manganese dissolution [mg/l] |
|---|---|---|---|---|
| E1 | Magnesium | 0.0 | 222 | 5.0 |
| E2 | Magnesium | 0.2 | 221 | 0.8 |
| E3 | Magnesium | 0.5 | 220 | 0.6 |
| E4 | Magnesium | 1.0 | 212 | 0.5 |
| E5 | Magnesium | 2.0 | 198 | 0.2 |
| E6 | Magnesium | 4.0 | 167 | 0.1 |
| E7 | Aluminum | 0.2 | 213 | 2.5 |
| E8 | Aluminum | 0.5 | 208 | 2.1 |
| E9 | Aluminum | 1.0 | 201 | 1.1 |
| E10 | Iron | 0.2 | 204 | 3.0 |
| E11 | Iron | 0.5 | 200 | 2.4 |
| E12 | Iron | 1.0 | 193 | 1.2 |
| E14 | Calcium | 0.2 | 211 | 2.6 |
| E15 | Calcium | 0.5 | 207 | 2.2 |
| E16 | Calcium | 1.0 | 198 | 1.5 |

TABLE 5-continued

|  | Another element | Content of another element [wt %] | Discharge capacity [mAh] | Amount of manganese dissolution [mg/l] |
|---|---|---|---|---|
| E17 | Chromium | 0.2 | 207 | 1.9 |
| E18 | Chromium | 0.5 | 203 | 1.4 |
| E19 | Chromium | 1.0 | 194 | 0.9 |

As shown in Table 5, the batteries E2 to E4 produced the most favorable results, exhibiting sufficient discharge capacities and small manganese dissolutions. In contrast, in the case of the battery E1, its discharge capacity was comparable to those of the batteries E2 to E4, but its manganese dissolution was inherent to λ-type manganese oxide. The above results indicate that magnesium further stabilized the crystal lattice of the manganese oxide, thereby further suppressing the dissolution of manganese into the electrolyte.

However, the discharge capacities of the batteries E5 to E6 lowered significantly. This is probably because when the amount of magnesium is large, there is a change in the entering path of lithium that will enter the lattice upon discharge and the site where lithium is stabilized.

In the batteries E7 to E19 in which manganese was replaced with an element other than magnesium, their manganese dissolutions were reduced in comparison with the battery E1 in which manganese was not replaced with another element, but their battery capacities were relatively small. It is considered that the kind of another element replacing manganese changes the effect of the crystal lattice on lithium that will enter therein.

COMPARATIVE EXAMPLE 1

A battery F1 was produced in the same manner as the battery A1, except that λ-type manganese oxide was not heat-treated. Since the λ-type manganese oxide used did not actually contain β-type manganese oxide, the crystallinity of β-type manganese oxide could not be measured.

(Evaluation)

In order to verify the effects of the invention, a test was conducted in the same manner as the pulse discharge tests of Example 1, and the lowest battery voltage (pulse voltage) was measured. Table 6 shows the result.

TABLE 6

|  | Heat treatment | Pulse voltage [V] |
|---|---|---|
| F1 | None | 2.16 |

As shown in Table 6, the pulse voltage of the battery F1 was undesirably relatively low. The reason is probably as follows. Because the λ-type manganese oxide was not heat-treated, the crystal structure of the λ-type manganese oxide did not change, and hence, there was no improvement in the balance between the readiness of lithium ions to enter the lattice of the manganese oxide (surface reactivity), the diffusibility of lithium ions inside the manganese oxide, the stability of lithium ions in the lattice of the manganese oxide, etc.

EXAMPLE 6

Disc-shaped negative electrodes with a diameter of 20 mm were produced, using 1-mm-thick hoops made of lithium alloys with aluminum contents as shown in Table 7, instead of the 1.0 mm-thick hoop made of lithium metal. Except for the use of these negative electrodes, batteries G1 to G8 were produced in the same manner as the battery A1. The battery G1 is the same as the battery A1. The aluminum content in the lithium alloy was determined in the following manner.

[Aluminum Content]

The aluminum content in the lithium alloy of the negative electrode was determined by dissolving an alloy sample into pure water and subjecting the resultant solution to a high-frequency inductively coupled plasma spectrometry (ICP). The analyzer used was ICPS-1000III manufactured by Shimadzu Corporation.

(Evaluation)

In order to verify the effects of the invention, tests were conducted in the same manner as the capacity check tests of Example 1, and the discharge capacity obtained until the battery voltage reached 2.5 V was checked. Also, in a hot and humid environment of 60° C. and 90% RH, the batteries were discharged at a resistance of 1 MΩ for 4 months, and the internal resistances (IR) of the batteries were measured before and after the discharge by an alternating current process at 1 kHz. The difference was calculated as "the amount of IR change due to discharge". Table 7 shows the results.

TABLE 7

|  | Al content [wt %] | Discharge capacity [mAh] | Amount of IR change due to discharge [Ω] |
|---|---|---|---|
| G1 | 0 | 222 | 9.2 |
| G2 | 0.1 | 225 | 7.6 |
| G3 | 0.2 | 227 | 6.6 |
| G4 | 1 | 229 | 6.2 |
| G5 | 5 | 232 | 5.9 |
| G6 | 10 | 231 | 5.8 |
| G7 | 15 | 226 | 5.6 |
| G8 | 20 | 201 | 5.6 |

As shown in Table 7, it has been found that the aluminum content in the lithium alloy affects the balance between the discharge capacity and the IR change due to discharge. The batteries G1 to G7 can provide stable discharge capacities, but the battery G8 exhibited a smaller discharge capacity. This is because alloying the active material of lithium with a metal element (Al) other than the active material resulted in a decrease in the energy density of the negative electrode. Also, it is essentially predicted that the greater the amount of another element (Al) is, the more the discharge capacity lowers; however, it has been found that, as long as the amount of another element is a suitable amount, the active material utilization rate in the discharge reaction is heightened by an increase in conductivity or the like, so that the loss in energy density is compensated for and the capacity tends to increase. Further, it has also been found that if the amount of another element is excessive, the decrease in energy density is greater than the improvement in active material utilization rate, thereby resulting in a decrease in discharge capacity.

Also, with respect to the IR change due to discharge, the batteries G3 to G8 were preferable. It is known that in a hot and humid environment the negative electrode surface is oxidized, due to moisture penetration, to form an inactive oxide film. It is also known that due to high temperature and discharge, the manganese oxide of the positive electrode is dissolved and deposited on the negative electrode surface to form a high resistance film thereon. That is, highly active lithium is very reactive and subject to deactivation upon the formation of a film on the negative electrode surface. However, it is thought that when lithium is alloyed with aluminum or the like as in the present invention, the lithium in the vicinity of the added another element is resistant to deactivation and functions effectively as a conductive path, as opposed to highly reactive lithium which is deactivated for the above-mentioned reason. It is thought that IR was stabilized due to the presence of such part (conductive path) that is resistant to deactivation. It is thought that the effect of IR stabilization can be obtained even if the amount of another element is relatively small, as long as it is more than a certain amount.

As described above, the present invention improves the storage characteristics, electrical characteristics and reliability of a lithium primary battery that includes a positive electrode using manganese oxide as an active material, a negative electrode using lithium and/or a lithium alloy as an active material, and a non-aqueous electrolyte, and improves the versatility of the lithium primary battery. The lithium primary battery of the present invention is highly versatile and is suited for applications in which appliances are used at −40° C. to 125° C. or used for longer periods of time than conventional periods. It is particularly preferable for appliances requiring long-term reliability or excellent large-current discharge characteristics or pulse discharge characteristics. According to the present invention, it is possible to obtain, for example, a high quality tire pressure monitoring (management) system (TPMS).

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A lithium primary battery comprising:
a positive electrode comprising a mixed crystalline manganese oxide;
a negative electrode comprising at least one selected from the group consisting of lithium and a lithium alloy; and
a lithium-ion conductive non-aqueous electrolyte,
wherein said mixed crystalline manganese oxide comprises at least λ-type manganese oxide and β-type manganese oxide, and
said β-type manganese oxide has a crystallinity of 300 to 500.

2. The lithium primary battery in accordance with claim 1, wherein said mixed crystalline manganese oxide has a specific surface area of 0.5 to 4 $m^2/g$.

3. The lithium primary battery in accordance with claim 1, wherein said mixed crystalline manganese oxide contains lithium in an amount of 1.5 wt % or less in an initial state.

4. The lithium primary battery in accordance with claim 1, wherein the manganese element contained in said mixed crystalline manganese oxide is partially replaced with another element, and said another element is contained in an amount of 1 wt % or less.

5. The lithium primary battery in accordance with claim 1, wherein said mixed crystalline manganese oxide is obtained by baking λ-type manganese oxide in air at 100° C. to 300° C.

6. The lithium primary battery in accordance with claim 1, wherein said lithium alloy contains at least aluminum.

7. The lithium primary battery in accordance with claim 6, wherein said lithium alloy contains said aluminum in an amount of 0.2 wt % to 15 wt %.

* * * * *